May 26, 1953  E. F. PIWCZYNSKI ET AL  2,639,641
GLARE ELIMINATING DEVICE FOR REARVIEW
MIRRORS OF MOTOR VEHICLES
Filed May 22, 1948
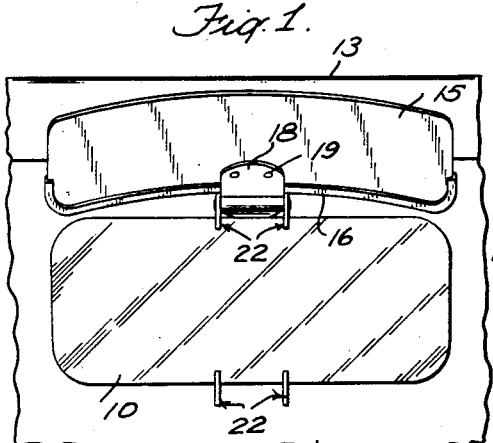
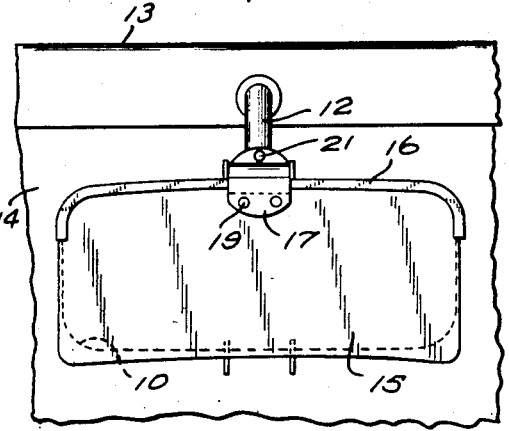
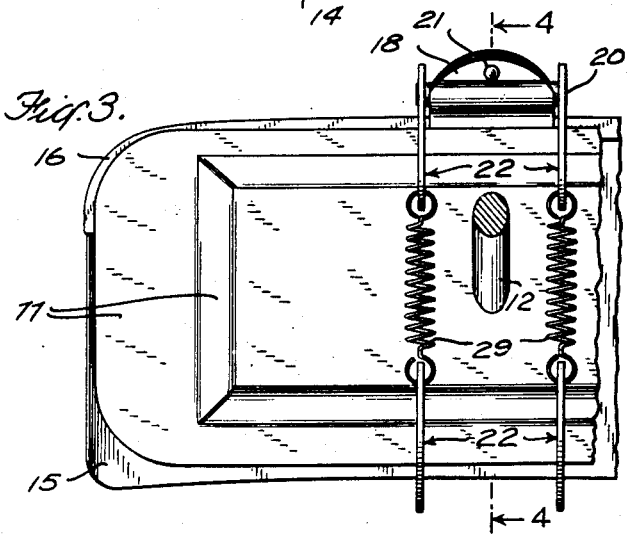
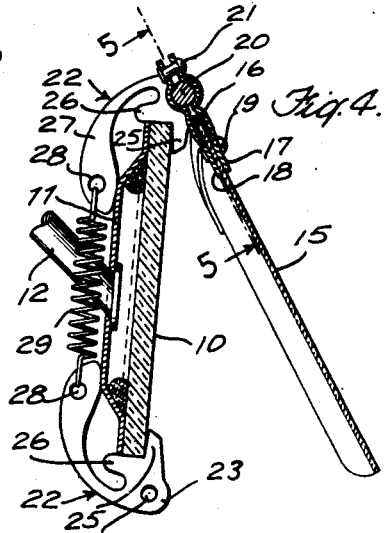
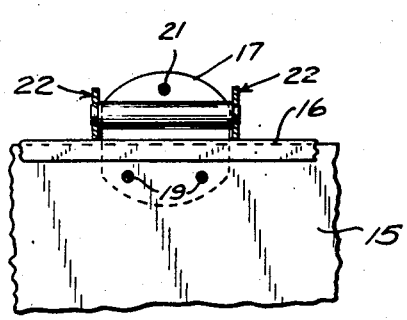
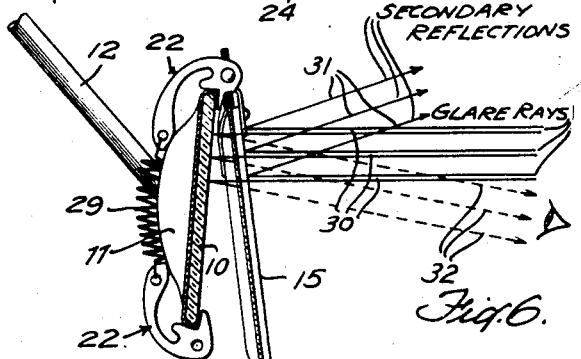
INVENTORS
EDWARD F. PIWCZYNSKI
ROMAN GALINSKI
BY
ATTORNEY Patented May 26, 1953

2,639,641

UNITED STATES PATENT OFFICE 2,639,641

GLARE ELIMINATING DEVICE FOR REAR-VIEW MIRRORS OF MOTOR VEHICLES

Edward F. Piwczynski and Roman Galinski,
New Britain, Conn.

Application May 22, 1948, Serial No. 28,576

3 Claims. (Cl. 88—77)

This invention relates to safety devices for motor vehicles and more particularly pertains to light filters for eliminating the glare of the headlights of approaching automobiles.

The invention provides a shield of glare eliminating material for the rear view mirror of a motor vehicle which is so mounted on the mirror that it can readily be moved to cover the mirror to eliminate the reflected glare of the headlights of a car at the rear and to uncover the mirror when normal vision to the rear is desired, without altering the position of the mirror or distracting the driver's attention. When moved to its position in front of the mirror, the shield will stop automatically at an acute angle to the face of the mirror so that the secondary reflections from the glare receiving surface of the shield will be thrown over the driver's head and not directed into his eyes. The novel mounting means for the shield permits it to be attached quickly and securely in correct position to any type, or size or thickness of rear view mirror, and readily and easily removed therefrom. Other features of the invention will become apparent from the description which follows.

The nature of the invention will be understood from the following description when considered in connection with the accompanying drawing forming a part thereof, and in which:

Fig. 1 is a front elevation of a rear view mirror with a glare eliminating shield embodying the invention mounted thereon and shown in retracted position so as not to cover the mirror;

Fig. 2 is a view similar to Fig. 1, but showing the shield in operative position in front of the mirror;

Fig. 3 is a partial rear elevation, on an enlarged scale, of the mirror and shield mounted thereon in operative position;

Fig. 4 is a sectional view on line 4—4 of Fig. 3, but with the shield moved slightly out of operative position;

Fig. 5 is a sectional view on line 5—5 of Fig. 4, and

Fig. 6 is a sectional view, similar to Fig. 4, showing the paths of travel of the primary and secondary reflections of the glare rays.

Like characters of reference refer to the same parts throughout the several views.

Referring to the drawing, reference character 10 designates a rear view mirror mounted on a supporting plate 11 which is attached to the outer end of a rod 12 affixed to the car body 13 at a suitable point above the windshield 14.

The glare eliminating device includes a shield 15 of non-inflammable and transparent material, neutral in color, which absorbs headlight glare. Any material which will absorb headlight glare and yet is transparent enough to permit a clear view of the road behind, and also is sufficiently heavy to retain its rigidity in use, may be utilized for the purpose. Heavy transparent sheet plastic which is neutral in color may be employed satisfactorily. The shield is rectangular in shape with rounded corners and is large enough to cover the entire reflecting face of the rear view mirror 10. It is bowed slightly as shown in Fig. 1, about an axis perpendicular to the upper edge of the shield, to present a convex surface toward the driver when the shield is in operative position in front of the mirror. The shield is retained in bowed position by means of a metallic rim 16 of channel shape in transverse cross-section which extends along the entire upper edge of the shield and downwardly along the adjacent sides for a short distance, as shown. The rim is pressed on the shield and is retained in position thereon by the friction between the materials.

The means for mounting the shield on the rear view mirror include opposed plates 17 and 18 which are attached to the upper central portion of the shield by two rivets 19 which pass through the shield and plates. These plates 17 and 18 are shaped to accommodate between them the rim 16, and the portions which extend beyond the rim are shaped to fit a pivot pin 20 snugly. The outer ends of the plates are held together by a rivet 21 and the friction between the plates and the pivot pin 20 may be increased by striking the end of the rivet 21 to bring the outer ends of the plates closer together, thus to grip the pin more closely. The pin 20 has fixed to each end, a hook 22 which, together with other similar hooks, secures the shield to the mirror 10. Each hook has a head 23 provided with a circular aperture 24 and two short arms 25 and 26, the adjacent faces of which define between them a right angle approximately, which receives the edge and front of the mirror, as shown in Fig. 4. An end of the pivot pin 20 passes through the aperture 24 and is upset sufficiently to fix the hook to the pin. Each hook has a tail 27 which projects from the body portion 23 in a direction substantially parallel to the arm 26 and then curves gradually to a direction substantially parallel to the arm 25, as depicted in Fig. 4. The cross-section of the tail 27 in the area adjacent the head 23 is sufficiently small to permit the outer end of the tail to be moved toward and away from the arm 25 on the head so as to vary the space between the arm and the outer end of the tail, to accommodate rear view mirrors and their supporting plates of different thicknesses, as illustrated in Figs. 4 and 6. The outer end portion of the tail of each hook, has a circular aperture 28 through which the end of a coil spring 29 is passed to attach it to the hook. Each end of a spring 29 is fastened more or less permanently to a hook, so that each spring connects two hooks.

To mount the glare shield 15 on the rear view mirror 10, the two hooks 22 at the ends of the pivot pin 20 are placed in position with the upper edge and face of the mirror in the right angle between the arms 25 and 26 and with the tails 27 of the hooks at the rear of the mirror. The other two hooks 22 are moved downwardly against the tension of springs 29 until the arms 25 are in contact with the lower part of the face of the mirror and the arms 26 are in engagement with the lower edge. The tension of the springs 29 will pull the tails of the hooks together until their inner edges are in contact with the back of the mirror or the supporting plate 11 therefor. If the upper and lower edges of the mirror do not fit snugly into the angle between arms 25 and 26 on the heads of the hooks 22, the tails are bent inwardly or outwardly with respect to the arms 25 to provide a smaller or larger space between the arms 25 and the tails. To remove the shield from the mirror, it is only necessary to pull the lower hooks downwardly against the tension of springs 29 until the arms 25 clear the lower edge of the mirror, after which the shield may be lifted off the mirror.

When mounted on the rear view mirror, the shield may readily be moved by the hand of the driver into and out of operative position in front of the mirror, and the friction between the pivot pin 20 and the plates 17 and 18 will retain the shield in the position to which it has been moved, until it is moved by the driver's hand into another position. When the shield is moved to operative position in front of the mirror, the metallic rim 16 of the shield will come into contact with the outer edge of the arms 25 of the two upper hooks 22 just before the shield reaches a position in which it is parallel with the face of the mirror, so that the shield and mirror will be at an acute angle to each other as shown in Figs. 4 and 6. With the shield in this position, the secondary reflections 31 of the glare rays 30, as indicated in Fig. 6, will be directed upwardly and rearwardly over the driver's head, instead of into his eyes, while the glare rays themselves will be filtered twice by the shield, once as they pass through the shield to the mirror and then as they are reflected from the mirror through the shield, with the result that the reflected rays 32 reaching the eyes of the driver will be soft and diffused.

A preferred form of the invention has been selected for illustration and description. Inasmuch as the invention may be embodied in other forms, it will be understood that changes may be made in the form, location and arrangement of the several parts of the device disclosed without departing from the principles of the invention.

What is claimed is:

1. A glare eliminating device for the rear view mirror of a motor vehicle comprising a shield, a pivot pin, opposed plates movably engaging the pin and fixed to the shield, means adjacent the pin for holding the plates together and for moving them more closely together to increase the friction between the pin and plates, a hook at each end of the pin and having a head and a tail portion with its head portion fixed to the pin, the head portion of each hook having spaced arms with adjacent faces extending at approximately right angles to each other and adapted to receive therebetween the upper edge and face of the mirror, the tail portion of each hook extending from the head in the direction generally of the arm projecting from the head portion which engages the upper edge of the mirror and thereafter curving to the direction generally in which extends the other arm on the head which engages the face of the mirror, the portion of the tail which is adjacent the head having a sufficiently small cross-sectional area so that the tail may be moved with respect to the head, the outer end portion of the tail being adapted to engage the rear of the mirror or a supporting plate therefor, similar hooks for engaging the lower edge of the mirror, and resilient means connecting the tail portions of upper and lower hooks to urge the hooks toward each other.

2. A glare eliminating device for the rear view mirror of a motor vehicle comprising a shield substantially coextensive in extent with the mirror, a pivot pin having a length constituting a minor portion of the width of the shield, opposed plates movably engaging the pin short of the ends thereof and fixed to the shield, a rivet adjacent the pin for holding the plates together and for moving them more closely together to increase the friction between the pin and plates, a hook at each end of the pin and having a head and a tail portion with its head portion fixed to the pin, the head portion of each hook having spaced arms with adjacent faces extending at approximately right angles to each other and adapted to receive therebetween the upper edge and face of the mirror, the tail portion of each hook extending from the head in the direction generally of the arm projecting from the head portion which engages the upper edge of the mirror and thereafter curving to the direction generally in which extends the other arm on the head which engages the face of the mirror, the portion of the tail which is adjacent the head having a sufficiently small cross-sectional area so that the tail may be moved with respect to the head, the outer end portion of the tail being adapted to engage the rear of the mirror or a supporting plate therefor, two spaced hooks similar to the hooks on the pin for engaging the lower edge of the mirror, and a coil spring connecting the tail portions of each pair of upper and lower hooks to urge the hooks toward each other and into engagement with the mirror.

3. A device for attaching a glare eliminating shield to a rear view mirror, comprising a series of four independent hooks having the main portions thereof positioned at the back of said mirror, two of said hooks engaging the top of said mirror and two engaging the bottom of said mirror, resilient means joining a top and bottom hook, each hook constructed to have a head portion, a tail portion and an integral connection of relatively small cross-sectional area that permits the tail portion to be bent in its own plane toward or away from said head portion to accommodate the said hook to the size and thickness of the mirror, the head portions of each hook having two relatively short arms extending therefrom with adjacent faces disposed substantially at right angles to each other to engage one edge and a small part of the front of the mirror, each hook engaging said mirror at the front, edge and back of said mirror and being maintained in position by the resilient means which forces said tail portions against the back of said mirror.

EDWARD F. PIWCZYNSKI.
ROMAN GALINSKI.

References Cited in the file of this patent

UNITED STATES PATENTS

| Number | Name | Date |
|---|---|---|
| 1,513,769 | Sullivan | Nov. 4, 1924 |
| 1,633,190 | Rader | June 21, 1927 |
| 1,777,520 | Gillespie | Oct. 7, 1930 |
| 1,905,868 | Hein | Apr. 25, 1933 |
| 1,909,302 | Moorby | May 16, 1933 |
| 1,926,979 | Gifford | Sept. 12, 1933 |
| 1,971,333 | Allam | Aug. 28, 1934 |
| 1,994,648 | Hoile | Mar. 19, 1935 |
| 2,118,962 | Barron | May 31, 1938 |
| 2,165,771 | Vlasak | July 11, 1939 |
| 2,233,739 | Gutierrez | Mar. 4, 1941 |
| 2,327,802 | Kelly | Aug. 24, 1943 |
| 2,420,259 | McNamara | May 6, 1947 |
| 2,511,590 | Keck | June 13, 1950 |